(12) United States Patent
Kroll

(10) Patent No.: US 7,401,957 B2
(45) Date of Patent: Jul. 22, 2008

(54) TEMPORARY SET STRUCTURE FOR HEADLAMP TO BUMPER DATUM

(75) Inventor: Benjamin C. Kroll, Manchester, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 230 days.

(21) Appl. No.: 11/123,587

(22) Filed: May 6, 2005

(65) Prior Publication Data

US 2006/0249987 A1 Nov. 9, 2006

(51) Int. Cl.
*B60Q 1/00* (2006.01)

(52) U.S. Cl. .................... 362/505; 362/507; 293/102; 293/155

(58) Field of Classification Search ............. 362/505, 362/507, 487; 293/102, 117, 120–122, 155
See application file for complete search history.

(56) References Cited

U.S. PATENT DOCUMENTS 2,281,346 A * 4/1942 Biller .......................... 362/225

6,413,107 B1 * 7/2002 Neuhorst et al. ............. 439/226

FOREIGN PATENT DOCUMENTS

| JP | 03157239 A | * 7/1991 |
|---|---|---|
| JP | 2001277935 | 10/2001 |

* cited by examiner

Primary Examiner—Jong-Suk (James) Lee
Assistant Examiner—Julie A. Shallenberger
(74) Attorney, Agent, or Firm—Gifford, Krass, Sprinkle, Anderson & Citkowski, P.C.

(57) ABSTRACT

A bracket allows controlled positioning of a bumper cover relative to a lamp housing (such as a headlamp housing) when the headlamp housing and bumper cover are mounted on a vehicle. The bracket has an elongated body having a first end and a second end, and attaches to the headlamp housing by temporary attachments, such as snap connections. The bracket further has bumper cover receiving slot configured to receive a portion of the bumper cover. The bracket may further include a pin receiving hole, positioned so as to receive a pin protruding from the headlamp housing for additional positioning accuracy. A temporary sub-assembly of the bracket and headlamp housing can be used in an improved vehicle assembly process, in which the sub-assembly is permanently mounted to the vehicle fender, and a portion of the bumper cover slid into bumper receiving slots on the bracket.

11 Claims, 3 Drawing Sheets

TEMPORARY SET STRUCTURE FOR HEADLAMP TO BUMPER DATUM

FIELD OF THE INVENTION

The invention relates to vehicles, in particular to automobiles having a bumper.

BACKGROUND OF THE INVENTION

A vehicle, such as an automobile, typically may have a pair of headlamps and a bumper extending across the front of the vehicle. The appearance of the vehicle can be improved by providing a small and well controlled design gap between the bumper cover and the headlamps.

However, such a design gap is difficult to control without significantly adding to the manufacturing complexity of the vehicle. Hence, improved apparatus and methods are needed to allow improved vehicular appearance with minimal added manufacturing complexity.

SUMMARY OF THE INVENTION

A bracket allows controlled positioning of a bumper cover relative to a headlamp housing (or other lamp housing) when the headlamp housing and bumper cover are mounted on a vehicle. The bracket has an elongated body having a first end and a second end, and attaches to the headlamp housing by temporary attachments, such as snap connections. The bracket further has bumper cover receiving slot configured to receive a portion of the bumper cover. The bracket may further include a pin receiving hole, positioned so as to receive a pin protruding from the headlamp housing for additional positioning accuracy.

A sub-assembly of the bracket and headlamp housing can be used in an improved vehicle assembly process, in which the bracket can be temporarily attached to the headlamp housing by pushing the headlamp housing and bracket together. The sub-assembly can then be permanently mounted to the vehicle fender, and a portion of the bumper cover slid into bumper receiving slots on the bracket. The location of the bumper cover in relation to the headlamp is controlled by the bracket so as to provide a visually pleasing narrow controlled gap between the headlamp housing and the bumper cover.

DETAILED DESCRIPTION OF THE INVENTION

Figure 1:
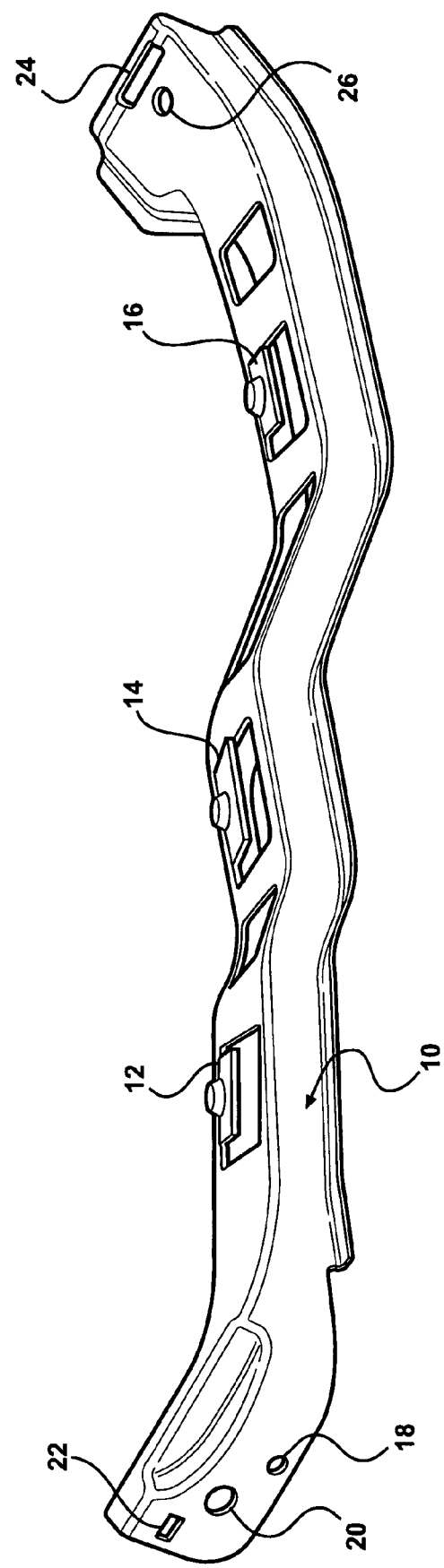
FIG. 1 illustrates a retainer bracket, attachable to a headlamp.

A retainer bracket (or bracket) is described which can be quickly and easily attached to a headlamp housing. The attachment of the bracket to the headlamp is temporary, allowing the combined headlamp/bracket assembly to be conveyed to an assembly line for permanent attachment to the vehicle body. The term sub-assembly is used to refer to the combination of bracket and headlamp, and also to the attachment process by which this combination is achieved. The term "headlamp", as used herein, generally refers to the headlamp housing, or a portion thereof, and not to the electrical lamp often enclosed within such a housing.

The bracket can be attached to the headlamp by urging the headlamp and bracket together, so as to form one or more snap connections. The snap connection can be formed by pushing a protruding part of the headlamp housing through a receiving hole (such as a slot) in the bracket. The snap connection may include a hook, barb, ball and socket, or similar structure. In other examples, a snap connection can be formed by pushing a protruding part of the bracket through a hole in the headlamp housing. The snap connection is a temporary attachment used to attach the bracket to the headlamp housing as part of an improved vehicle assembly process. In a completed vehicle, the bracket and headlamp housing can be attached to the vehicle by other permanent attachments, such as a bolt or other connector passing through the headlamp, bracket, and part of the vehicle fender.

The bracket provides one or more bumper receiving slots for the bumper cover. When the bumper cover is slid into the bumper receiving slots, a design gap is provided between the bumper cover and the headlamp housing. The provision of a datum pin on the headlamp housing, passing through a pin-receiving hole in the bracket, provides close positional control of the bracket in relation to the headlamp, and hence close control over the design gap. This allows an improved appearance of the front of the vehicle.

In one example, the bracket is made out of sheet metal, and is sub-assembled to the headlamp housing using at least one snap molded into the headlamp housing. The term snap is used to describe a protrusion that passes through or into a snap receiver (such as a hole), and is subsequently difficult to remove from the snap receiver, at least in comparison with the formation process.

In one example, the bracket attaches to the headlamp housing using a snap and a hook, each of which protrudes from the headlamp housing, and which pass through corresponding holes within the bracket. Furthermore, a pin is provided on the headlamp housing which passes through a pin receiving hole in the bracket, with close tolerance. The pin provides a positional datum between the bracket and the headlamp. The headlamp/bracket assembly can then be transported to the assembly line and permanently fastened to the vehicle body. The bumper cover is slid into one or more bumper receiving slots provided by the bracket, providing a visually attractive close fit between a portion of the bumper cover and a portion of the headlamp housing.

The headlamp housing provides datum points to the bracket, and the headlamp-bracket sub-assembly is temporary yet robust.

An example temporary attachment uses hook, snap, and pin features molded into the headlamp housing to datum the bracket to the headlamp. This temporarily provides a robust attachment allowing transportation between, for example, a headlamp supplier and the final assembly line at an automobile manufacturer. No additional fasteners are required between the bracket and the headlamp assembly, and sub-assembly time is reduced. There need be no bolts or similar complex attachments between the bracket and the headlamp.

Designs according to the present invention minimize manufacturing variation between the headlamp and bumper cover, presenting a more pleasing appearance to a customer. The sub-assembly of the bracket and headlamp housing is also low cost, as it can be achieved using only push-together connections, such as snap connections.

After sub-assembly of the bracket and headlamp, mounting holes in the bracket can be in substantial register with headlamp mounting holes molded into the headlamp housing, allowing permanent assembly of the headlamp/bracket sub-assembly to the vehicle using attachment hardware passed through the registered holes. The manufacturing variation between the bumper cover and the headlamp is reduced, allowing a narrow design gap (or bumper gap) between the bumper cover and the headlamp housing, with improved visual appearance.

FIG. 1 shows a bracket according to an example of the present invention. The bracket has a generally elongated body 10, having a first end and a second end. The bracket body presents a profile shaped to generally match the underside of the headlamp. The bracket has first, second, and third bumper receiving slots at 12, 14, and 16 respectively. The bumper cover slides into these bumper receiving slots after mounting of the headlamp/bracket sub-assembly on the vehicle. The bracket further includes pin receiving hole 18, first mounting hole 20, hook receiving hole 22, snap receiving hole 24 (in this case, a slot), and second mounting hole 26.

Figure 2:
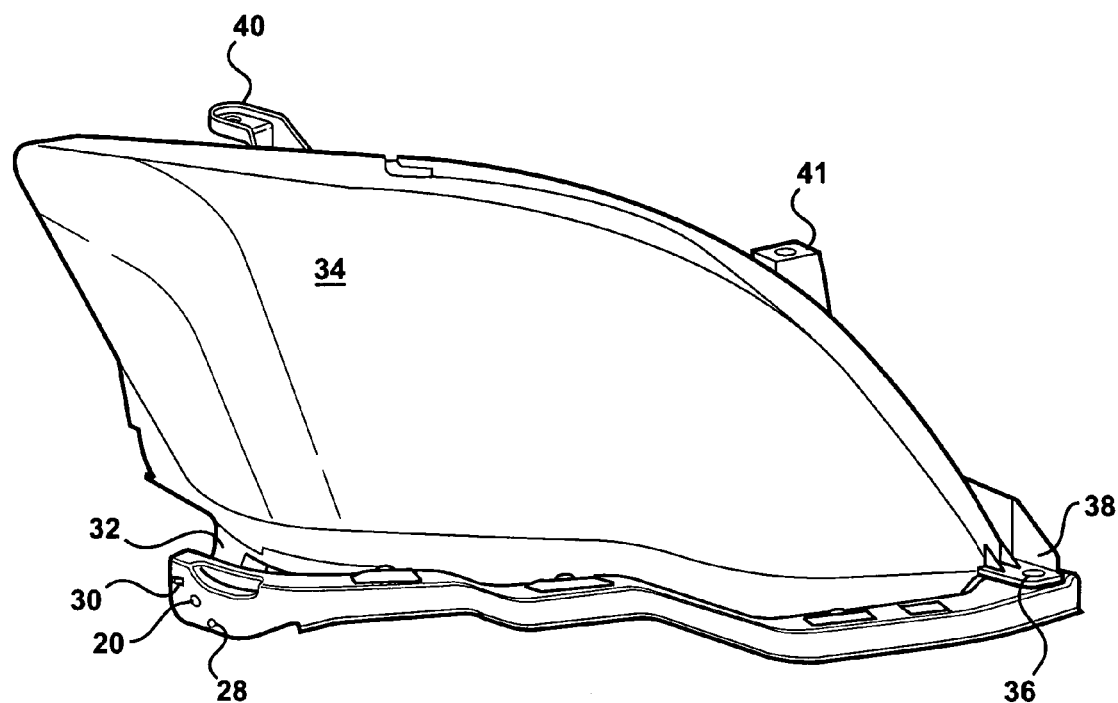
FIG. 2 shows a headlamp/retainer bracket assembly.

FIG. 2 shows the bracket sub-assembled onto the headlamp. The figure shows headlamp housing 34 having first headlamp flange 32 providing hook 30 and pin 28. After sub-assembly of the bracket to the headlamp, hook 30 protrudes through the hook receiving hole in the bracket, and pin 28 protrudes through the pin receiving hole in the bracket, proximate to the first end of the bracket. Here, the term snap connection includes a hook connection, and similar push-together connections.

A first headlamp mounting hole (not shown in this view) is in register with first mounting hole 20, to allow permanent mounting of the bracket/headlamp subassembly to the fender of a vehicle.

Proximate to the second end of the bracket, a second headlamp flange 38 provides a second headlamp mounting hole 36, which is in register with the second mounting hole in the bracket. The mounting holes accept mounting hardware such bolts to allow permanent mounting of the subassembly to the body of a vehicle. The figure also shows additional headlamp mounting brackets 40 and 41, which can also be used to mount the headlamp to the vehicle.

Figure 3:
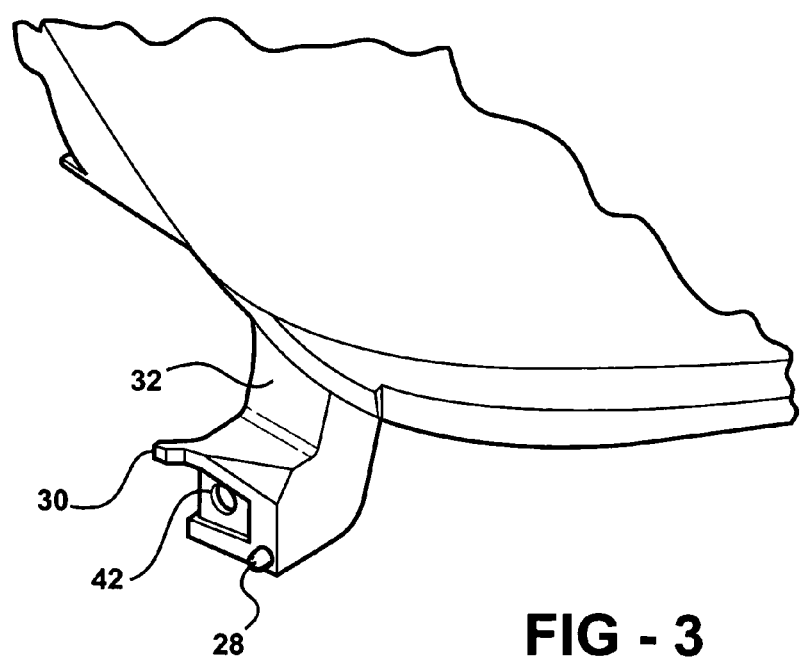
FIG. 3 shows hook and pin features of the headlamp housing, the pin providing a reference datum.

FIG. 3 shows the first headlamp flange 32 in more detail, including hook 30, first headlamp mounting hole 42, and pin 28. The first headlamp mounting hole is in register with the first mounting hole of the bracket, after sub-assembly.

Figure 4:
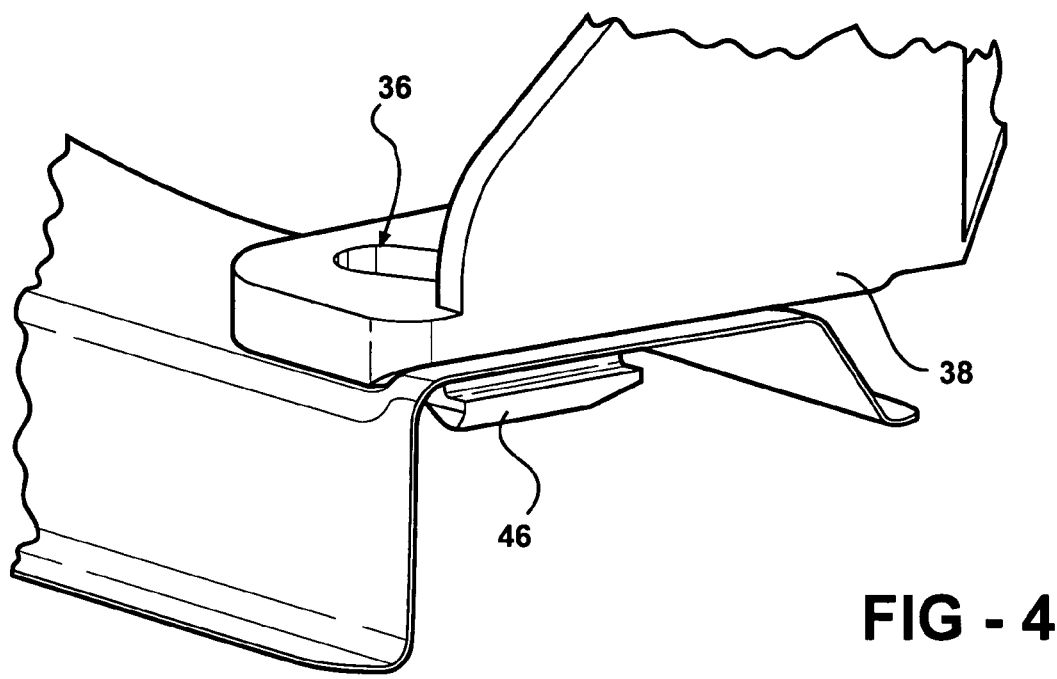
FIG. 4 illustrates a clip feature of the headlamp housing.

FIG. 4 shows in more detail the second end of the bracket, showing the snap 46 which is inserted through snap receiving hole 24 in the bracket (as shown in FIG. 1). The second headlamp mounting hole 36 is in register with second mounting hole 26 after sub-assembly, and allows permanent mounting of the sub-assembly to the vehicle body.

Figure 5:
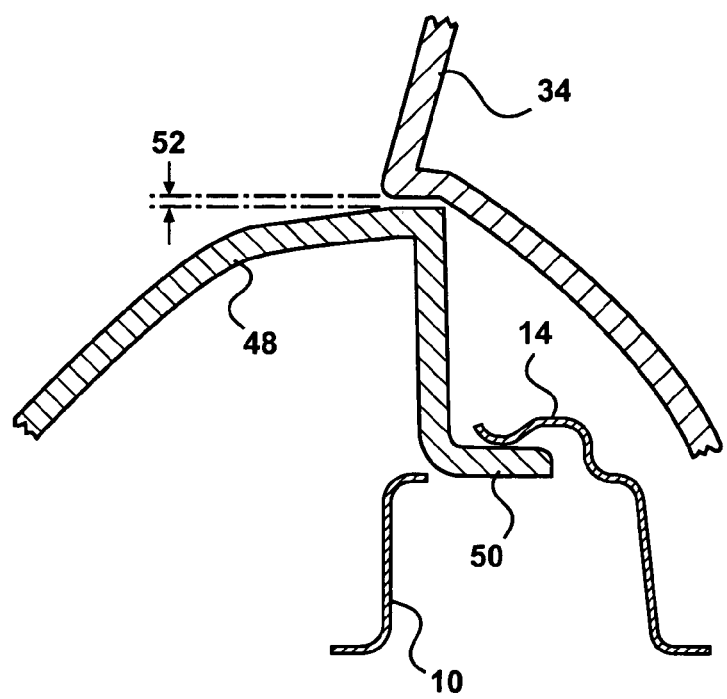
FIG. 5 illustrates, in cross section, the provision of receiving slots in the retainer bracket, and the positioning of the bumper cover in these slots.

FIG. 5 shows a cross section through the bracket 10, showing the bumper cover 48 having a lip 50 that is received by the bumper receiving slot 14. This provides a small design gap, the narrow bumper gap 52 between the bumper cover 48 and the headlamp housing 34.

The overall profile of the bracket can be altered from that given here. An example bracket has an elongated body, having a profile substantially matching the underside of the headlamp housing.

The number of bumper receiving slots can be other than three, for example two may be used, or four or more. A single slot extending along part, most, or all of the length of the bracket can also be used.

In the examples above, a snap, hook (a form of snap), and pin are molded into a resin headlamp housing. However, other configurations are possible within the spirit of the invention, including provision of one or more of the snap, hook, and pin components on the bracket. For example, a snap formed in the bracket may push through a snap-receiving hole formed within the headlamp housing.

Other push-together temporary connections between the bracket and headlamp can be used, which may include one or more of the following: contact adhesive, double-sided adhesive tape, a hook-and-loop connector, plug, magnet, suction cup, snap-in pillar, other snap-lock configuration, hole (such as a circular hole, slot, keyhole, oval, or other geometric shape hole), and the like. One or more push-together mechanical connections can be used, such as a clip, hook, snap, plug, and the like.

Brackets according to the present invention can also be temporarily attached to a radiator grille, vehicle body panel, or other vehicle body component, so as to provide one or more bumper cover receiving slots. Figures discussed above show a front headlamp housing, however examples of the invention also include use with a rear lamp housing or other vehicle lamp housings. The bracket may also curve around a headlamp housing, for example, also curving around a turn signal lamp housing.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. An apparatus for providing a controlled gap between a bumper cover and a lamp housing when the lamp housing and bumper cover are mounted on a vehicle, the lamp housing having an underside and a plurality of protrusions, the apparatus including:

an elongated body having a first end and a second end, the elongated body having a top surface shaped to conform to the underside of the lamp housing, and a plurality of holes configured to receive the plurality of protrusions; and a bumper receiving slot formed in the elongated body, the bumper receiving slot being shaped so as to receive a portion of the bumper cover, the elongated body being configured so as to attach directly to the lamp housing using snap connections proximate first end and the second end, the elongated body including a snap receiving hole configured to connect with a protruding part of the lamp housing, or a protrusion configured to connect with a hole in the lamp housing.

2. An apparatus for providing a controlled gap between a bumper cover and a lamp housing when the lamp housing and bumper cover are mounted on a vehicle, the lamp housing having an underside and a plurality of protrusions, the apparatus including:

an elongated body having a first end and a second end, the elongated body having a top surface shaped to conform to the underside of the lamp housing, and a plurality of holes configured to receive the plurality of protrusions; and a bumper receiving slot formed in the elongated body, the bumper receiving slot being shaped so as to receive a portion of the bumper cover the plurality of holes including a first snap receiving hole proximate the first end, and a second snap receiving hole proximate to the second end, the lamp housing being a vehicle lamp housing, the bumper cover being a cover for a vehicle bumper, the elongated body being configured so as to attach directly to the lamp housing using snap connections, the snap connections being formed cooperatively between the plurality of protrusions of the lamp housing and the plurality of holes in the elongated body.

3. The apparatus of claim 2, wherein the plurality of holes further includes a pin receiving hole.

4. An apparatus allowing controlled positioning of a bumper cover relative to a lamp housing when the lamp housing and bumper cover are mounted on a vehicle, the apparatus including:

an elongated body, the elongated body and the lamp housing cooperatively providing a snap attachment; and a bumper cover receiving slot configured to receive a portion of the bumper cover, the lamp housing being a vehicle lamp housing, the bumper cover being a cover for a vehicle bumper, the elongated body being a bracket configured so as to attach directly to the lamp housing using the snap connection, the snap connection being formed cooperatively between the bracket and the lamp housing.

5. The apparatus of claim 4, wherein the elongated body and the lamp housing cooperatively provide a first snap attachment proximate to a first end of the elongated body, and a second snap attachment proximate to a second end of the elongated body.

6. The apparatus of claim 5, wherein the elongated body further includes a pin receiving hole, positioned so as to receive a pin protruding from the lamp housing when the first and second snap attachments are formed.

7. A sub-assembly for use in assembly of a vehicle, the vehicle having a bumper cover, the sub-assembly comprising;

a lamp housing; and a bracket, having an elongated body, and a bumper cover receiving slot shaped to receive a portion of the bumper cover, the bracket being attached to the lamp housing by at least one snap connection formed cooperatively between the bracket and the lamp housing by a protruding part of the lamp housing and a receiving hole in the bracket, the elongated body of the bracket being shaped to conform to a lower edge of the lamp housing.

8. The sub-assembly of claim 7, wherein the lamp housing has at least one molded snap extending through a hole in the bracket.

9. A method of assembling a lamp housing and a bumper cover on a vehicle to provide a controlled gap between the lamp housing and a bumper cover, the method comprising the steps of:

providing a bracket, the bracket having a bumper cover receiving slot;

attaching the bracket to the lamp housing by urging the lamp housing and the bracket together so as to engage one or more snap connections between the lamp housing and the bracket, the lamp housing having at least one snap molded into the lamp housing that is received by a hole in the bracket;

mounting the lamp housing and the bracket on the vehicle; and mounting the bumper cover on the vehicle, a portion of the bumper cover entering the bumper receiving slot, the location of the bumper cover in relation to the lamp housing being controlled by the bumper receiving slot so as to provide the controlled gap between the lamp housing and the bumper cover.

10. The method of claim 9, wherein the step of attaching the bracket to the lamp housing further includes passing a pin provided by the lamp housing through a pin receiving hole provided by the bracket.

11. The method of claim 9, wherein the step of mounting the lamp housing and the bracket on the vehicle includes passing an attachment through a mounting hole in the bracket and a lamp housing mounting hole in the lamp housing, the mounting hole and lamp housing mounting hole being substantially in register after attachment of the bracket to the lamp housing.

* * * * *